US009262191B2

(12) United States Patent
Wang et al.

(10) Patent No.: US 9,262,191 B2
(45) Date of Patent: Feb. 16, 2016

(54) METHOD, APPARATUS, AND SYSTEM FOR PROCESSING SERVICE FLOW

(71) Applicant: Huawei Technologies Co., Ltd., Shenzhen (CN)

(72) Inventors: Yungui Wang, Nanjing (CN); Fuqing Sun, Nanjing (CN); Xiaohua Yang, Shenzhen (CN); Wei E, Nanjing (CN); Jun Guo, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 125 days.

(21) Appl. No.: 14/154,427

(22) Filed: Jan. 14, 2014

(65) Prior Publication Data

US 2014/0130047 A1 May 8, 2014

Related U.S. Application Data

(63) Continuation of application No. PCT/CN2011/077159, filed on Jul. 14, 2011.

(51) Int. Cl.
*G06F 9/455* (2006.01)
*G06Q 10/00* (2012.01)
(Continued)

(52) U.S. Cl.
CPC ............ *G06F 9/45533* (2013.01); *G06Q 10/00* (2013.01); *H04L 45/38* (2013.01); *H04L 67/327* (2013.01)

(58) Field of Classification Search
CPC .. G06F 9/45533; H04L 29/0872; H04L 45/00
USPC ................ 718/1; 709/201; 370/392
See application file for complete search history.

(56) References Cited

U.S. PATENT DOCUMENTS 7,228,337 B1 * 6/2007 Bornstein et al. ............. 709/217
8,879,554 B2 * 11/2014 Emmadi et al. ............... 370/392
(Continued)

FOREIGN PATENT DOCUMENTS

CN 101515880 A 8/2009
CN 101772102 A 7/2010
(Continued)

OTHER PUBLICATIONS

Foreign Communication From a Counterpart Application, Chinese Application No. 201180001386.2, Chinese Office Action dated Mar. 5, 2013, 6 pages.
(Continued)

*Primary Examiner* — Andy Ho
(74) *Attorney, Agent, or Firm* — Conley Rose, P.C.; Grant Rodolph (57) ABSTRACT

A method, an apparatus, and a system for processing a service flow, which belong to the field of communications. Correspondence between a service application attribute and a service application identifier is preconfigured on an NSP board so that after a service flow carrying the service application attribute is received, the service application identifier of the service flow may be determined, which service application corresponding to a service flow may be known according to the service application identifier corresponding to the service flow, and when a plurality of service applications is deployed on an NSP at the same time, a service flow can be correctly sent to a virtual machine of a corresponding service application for service processing.

19 Claims, 5 Drawing Sheets

(51) Int. Cl.
*H04L 29/08* (2006.01)
*H04L 12/721* (2013.01)

(56) References Cited

U.S. PATENT DOCUMENTS

| | | | |
|---|---|---|---|
| 9,014,184 B2* | 4/2015 | Iwata et al. | 370/389 |
| 2002/0089963 A1 | 7/2002 | Kang et al. | |
| 2007/0058632 A1 | 3/2007 | Back et al. | |
| 2007/0169049 A1 | 7/2007 | Gingell et al. | |
| 2009/0083445 A1* | 3/2009 | Ganga | 709/250 |
| 2012/0324536 A1* | 12/2012 | McDysan | 726/3 |

FOREIGN PATENT DOCUMENTS

| | | |
|---|---|---|
| CN | 101826999 A | 9/2010 |
| CN | 101841456 A | 9/2010 |
| CN | 102014448 A | 4/2011 |
| WO | 2009103625 A1 | 8/2009 |

OTHER PUBLICATIONS

Foreign Communication From a Counterpart Application, European Application No. 11858212.1, Extended European Search Report dated Apr. 23, 2014, 5 pages.

Foreign Communication From a Counterpart Application, PCT Application No. PCT/CN2011/077159, English Translation of Chinese Search Report dated Apr. 12, 2012, 3 pages.

Foreign Communication From a Counterpart Application, PCT Application No. PCT/CN2011/077159, English Translation of Chinese Written Opinion dated Apr. 12, 2012, 11 pages.

Liu, Z., et al. "Virtualization Technology Applications in Commercial Banks," China Academic Journal Electronic Publishing House, Jun. 2008, pp. 46-49.

English Abstract of Virtualization Technology Applications in Commercial Banks, May 30, 2014, 1 page.

Feng, L., "Virutalization Stays Constant to Cope with Changes," CIOUInsight, Strategic Tech, Feb. 23, 2008, pp. 72-75.

English Abstract of Virutalization Stays Constant to Cope with Changes, May 30, 2014, 1 page.

Zhang, Y., "VMware Virtualization Technology Help Telecommunications Information," China Academic Journal Electronic Publishing House, Sep. 2008, pp. 76-77.

English Abstract of VMware Virtualization Technology Help Telecommunications Information, May 30, 2014, 1 page.

Partial English Translation and Abstract of Chinese Patent Application No. CN101826999A, Mar. 7, 2014, 7 pages.

* cited by examiner

— continuation of an International Application No. PCT/CN2011/077159, filed on Jul. 14, 2011, which is hereby incorporated by reference in its entirety.

METHOD, APPARATUS, AND SYSTEM FOR PROCESSING SERVICE FLOW

CROSS-REFERENCE TO RELATED APPLICATION

This application is a continuation of International Application No. PCT/CN2011/077159, filed on Jul. 14, 2011, which is hereby incorporated by reference in its entirety.

TECHNICAL FIELD

The present invention relates to the field of communications, and in particular, to a method, an apparatus, and a system for processing a service flow.

BACKGROUND

Currently, communication networks tend to become more and more intelligent, and service diversity becomes an important characteristic of a communication network. However, service diversity is a huge challenge for a switch device or a routing device in a current network. In one aspect, service application procedures or service logic processing of a switch device and a routing device is complicated. In another aspect, it is difficult to take advantages of a switch device and a routing device because of a variety of service applications.

A Network Service Platform (NSP) board may be connected to an Access Router (AR) or a switch to dedicatedly process various service applications such as a security service, server integration, and an application acceleration service. At the same time, an NSP has an independent hardware system and software system and can conveniently process one or more service applications.

A router or a switch may be connected to one or more NSP boards. The router or the switch includes at least a main control board, a local area network (LAN) line card, or a wide area network (WAN) line card, and a backend board, and the router or the switch is connected to the NSP board through the backend board. The main control board includes a microprocessor unit (MPU) and a switching unit (also called switching fabric). The switching unit is responsible for data exchange between the router or the switch and the NSP board. Traffic processed by a service application on the NSP is forwarded from the LAN line card or the WAN line card on the router or the switch through a switching unit. Currently, three typical service flow forwarding modes mainly exist, that is, a host mode, a mirror mode, and a redirection mode.

In a host mode, a service application on an NSP directly provides a service (such as a local email server or a voice call controller) for a user, and a destination Internet Protocol (IP) or a Media Access Control (MAC) address of a service flow sent by a user terminal is an IP address or a MAC address of a virtual machine that is responsible for processing the service application of the service flow and is on an NSP board. The service flow is forwarded by a LAN or a WAN line card on a router or a switch to the NSP through a switching unit, and then service traffic of the user terminal is processed by the virtual machine on the NSP.

In a mirror mode, a service application that can be processed on an NSP, such as a traffic statistics application or a virus detection application, is invisible to a user terminal. That is, a destination IP or a MAC address of service traffic of the user terminal is not an IP or MAC address of a virtual machine that is responsible for processing a service application of the service flow and is on an NSP board. A service flow sent by the user terminal requires a LAN line card or a WAN line card on a router or a switch to make a copy of service traffic and send the copy to the NSP through a switching unit, and the virtual machine on the NSP processes the copied service traffic of the user terminal.

In a redirection mode, being similar to the mirror mode, a service application that can be processed on an NSP, such as a firewall, is also invisible to a user terminal. That is, a destination IP or a MAC address of service traffic of the user terminal is not an IP or MAC address of a virtual machine that is responsible for processing a service application of the service flow and is on an NSP board. A service flow sent by the user terminal is redirected and sent by a LAN line card or a WAN line card on a router or a switch through a switching unit to the NSP, and then the virtual machine on the NSP processes the service traffic and then sends the service traffic to an original destination address through the switching unit after the processing is completed.

In the mirror mode and the redirection mode of service flow forwarding, the destination IP or the MAC address sent by the user terminal is not the IP or MAC address of the virtual machine that is responsible for processing the service application of the service flow and is on the NSP board. Therefore, when the NSP needs to process a plurality of service applications, the virtual machine on the NSP needs to monitor all packets on a network adapter. That is, a virtual machine service application receives traffic of other services in addition to traffic of a service application processed by the virtual machine. Therefore, service flows among different service applications cannot be isolated.

SUMMARY

To solve a problem that service flows cannot be isolated when a plurality of service applications exists on an NSP, the present invention proposes a method, an apparatus, and a system for processing a service flow. The technical solutions are as follows:

A method for processing a service flow includes: receiving a service flow into which a service application attribute is inserted by a network device; determining, according to preconfigured correspondence between a service application attribute and a service application identifier, a destination virtual machine capable of processing the service flow; and removing the service application attribute from the service flow, and sending the service flow from which the service application attribute is removed to the destination virtual machine.

An apparatus for processing a service flow includes: a receiving unit configured to receive a service flow into which a service application attribute is inserted by a network device; and a service flow isolation unit configured to determine, according to preconfigured correspondence between a service application attribute and a service application identifier, a destination virtual machine capable of processing the service flow, remove the service application attribute from the service flow, and send the service flow from which the service application attribute is removed to the destination virtual machine.

Based on the apparatus for processing a service flow, the present invention further provides a system for processing a service flow.

A system for processing a service flow includes the foregoing apparatus for processing a service flow and a network device.

The network device is configured to send a service flow into which a service application attribute is inserted to the apparatus for processing a service flow.

Beneficial effects of the technical solutions provided in the embodiments of the present invention are, in the present invention, correspondence between a service application attribute and a service application identifier is preconfigured on an NSP board so that after a service flow carrying a service application attribute is received, a service application identifier of the service flow may be determined, which service application corresponding to the service flow may be known according to the service application identifier corresponding to the service flow, and when a plurality of service applications is deployed on an NSP at the same time, a service flow can be correctly sent to a virtual machine of a corresponding service application for service processing.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more clearly, the following describes the embodiments of the present invention in further detail with reference to the accompanying drawings.

Embodiment 1

Figure 1:
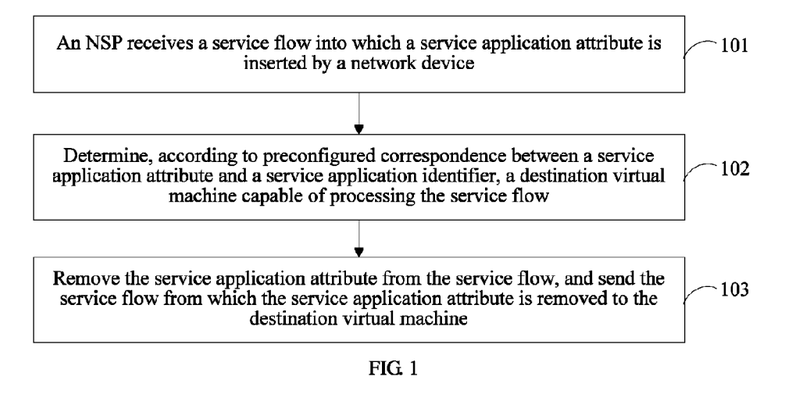
FIG. 1 is a flow chart of a method for processing a service flow according to Embodiment 1 of the present invention.

As shown in FIG. 1, an embodiment of the present invention provides a method for processing a service flow, where the method includes:

101. An NSP receives a service flow into which a service application attribute is inserted by a network device.

102. Determine, according to preconfigured correspondence between a service application attribute and a service application identifier, a destination virtual machine capable of processing the service flow.

103. Remove the service application attribute from the service flow, and send the service flow from which the service application attribute is removed to the destination virtual machine.

In the present invention, correspondence between a service application attribute and a service application identifier is preconfigured on an NSP board so that after a service flow carrying a service application attribute is received, a service application identifier of the service flow may be determined, which service application corresponding to the service flow may be known according to the service application identifier corresponding to the service flow, the service flow is sent to only a destination virtual machine that is responsible for processing the service application, and even when virtual machines for processing a plurality of service applications are deployed on an NSP at the same time, a service flow can be correctly sent to a corresponding virtual machine for service processing.

Embodiment 2

An embodiment of the present invention provides a method for processing a service flow, which is improved based on Embodiment 1.

Figure 2:
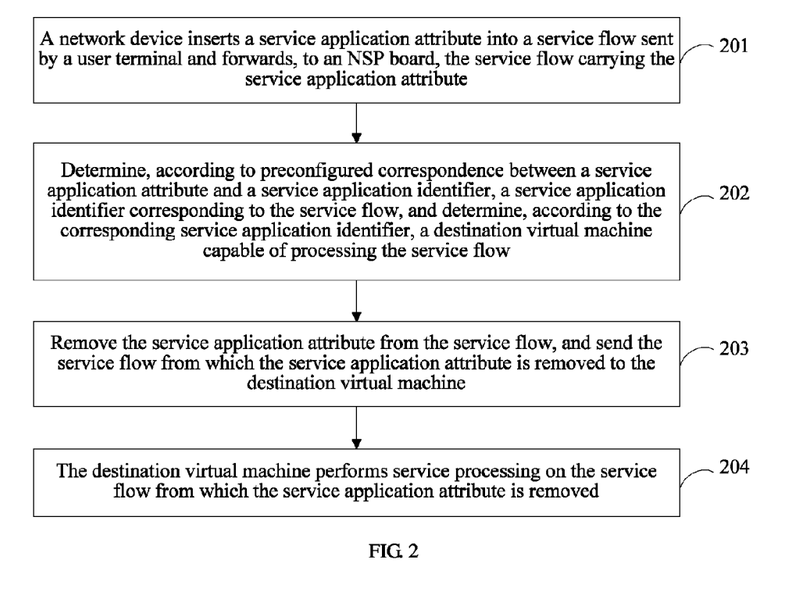
FIG. 2 is a flow chart of a method for processing a service flow according to Embodiment 2 of the present invention.

As shown in FIG. 2, a method for processing a service flow specifically includes:

201. A network device inserts a service application attribute into a service flow sent by a user terminal and forwards, to an NSP board, the service flow carrying the service application attribute.

In the embodiment of the present invention, the network device may specifically be a router or a switch.

It should be noted that, correspondence between a service application attribute and a service application identifier is stored on an NSP board, and correspondence between a service flow attribute and a service application attribute may further be stored. Correspondence between a service flow attribute and a service application attribute is stored in a network device.

In this embodiment, the service application attribute includes one or more items of the following: a combination of a forwarding mode of a service flow (Forwarding Mode of Service Flow) and a source device number of the service flow, a destination device number, a source device port number, a destination device port number, a service priority, a virtual local area network (VLAN) identity of a source device, a VLAN identity of a destination device, and a central processing unit (CPU) code. VLAN indicates a virtual local area network.

A service flow packet is an object that is to be processed by an NSP board. A service flow is a set of service flow packets. A service flow attribute is specifically an attribute indicated by each protocol field in the service flow packet, for example, a source MAC address, a destination MAC address, a VLAN identifier, a source IP address, a destination IP address, a source port number, and a destination port number of the service flow packet.

A service application identifier is specifically network interface information which is used to distinguish virtual machines on an NSP, and includes a virtual network interface identifier, for example, an IP address or an MAC address of a virtual machine, or an identifier of a port for communications between a virtual network interface of a virtual machine and a service flow isolation unit.

Figure 3:
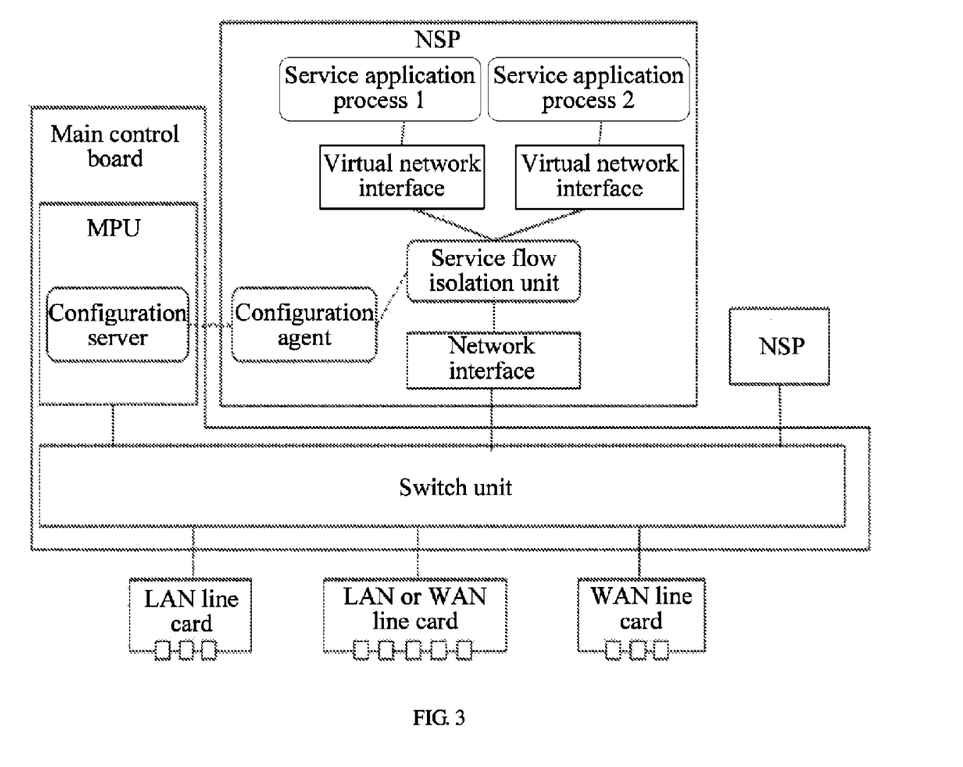
FIG. 3 is a first schematic structural diagram of an improved NSP according to Embodiment 2 of the present invention.
Figure 4:
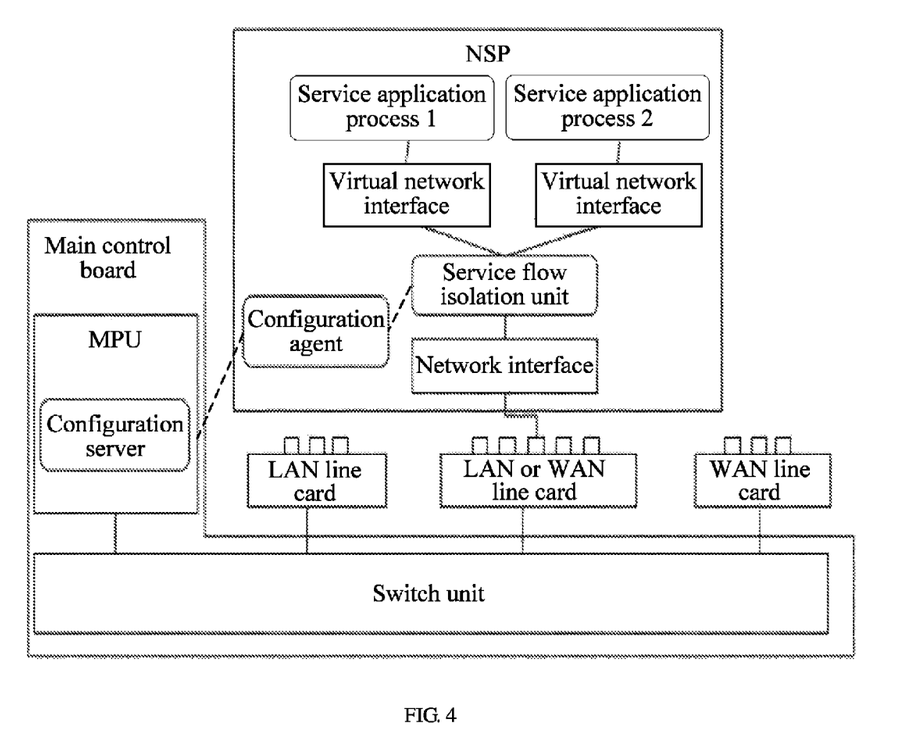
FIG. 4 is a second schematic structural diagram of an improved NSP according to Embodiment 2 of the present invention.

A structure of an NSP may be shown in FIG. 3 or FIG. 4, and a plurality of virtual machines may be established on the NSP, which are responsible for processing different service applications. A corresponding virtual network interface is configured for each virtual machine. In this embodiment, a service flow isolation unit determines, through a service application identifier, that a service flow is forwarded to which destination virtual machine.

In Table 1, the preconfigured correspondence between a service application attribute and a service application identifier is described:

TABLE 1

| Service Application Attribute | Service Application Attribute Value | Service Application Identifier |
|---|---|---|
| CPU code | 1 | Identifier of service application A |
| CPU code | 2 | Identifier of service application B |
| VLAN identifier | 100 | Identifier of service application C |
| VLAN identifier | 101 | Identifier of service application D |

It should be noted that, only a part of service application attributes are listed in Table 1. In a practical application, a service application attribute may further include other attributes, for example, a source port number, a destination port number, a source device number, a destination device number, a packet identifier, a service priority, a forwarding type. A service application identifier is used for distinguishing different service application processes. During specific implementation, the service application identifier may specifically be a virtual network interface identifier, or an identifier of a port for communications between a virtual network interface and a service flow isolation module.

The network device inserts the service application attribute into the service flow sent by the user terminal, which specifically includes two scenarios:

(1) When the service application attribute includes one or more items of the following: a combination of a forwarding mode of a service flow and a source device number, a destination device number, a source device port number, a destination device port number, a service priority, a virtual local area network VLAN identity of a source device, and a VLAN identity of a destination device, the network device receives the service flow sent by the user terminal, and inserts the service application attribute into the service flow according to a service flow attribute.

Specifically, the network device receives the service flow sent by the user terminal. When the service flow passes through a CPU of the network device, a software module on the CPU of the network device inserts the service application attribute into the service flow according to the service flow attribute. When the service flow passes through a LAN interface, a forwarding chip of LAN interface hardware inserts the service application attribute into the service flow according to the service flow attribute.

(2) When the service application attribute includes a CPU code, the network device inserts the CPU code into the service flow according to a service flow attribute and correspondence between a service flow attribute and a CPU code in a service application attribute. Specifically, when the service flow passes through a LAN interface, a forwarding chip of LAN interface hardware inserts the CPU code into the service flow according to the service flow attribute.

It should be noted that, when the service application attribute includes a CPU code, before step 201, the method further includes configuring the correspondence between a CPU code in a service application attribute and a service application identifier and the correspondence between a service flow attribute and a CPU code in a service application attribute, and sending the correspondence between a service flow attribute and a CPU code in a service application attribute to the network device.

202. Determine, according to preconfigured correspondence between a service application attribute and a service application identifier, a service application identifier corresponding to the service flow, and determine, according to the corresponding service application identifier, a destination virtual machine capable of processing the service flow.

After receiving the service flow carrying the service application attribute, the service flow isolating unit on the NSP uses the correspondence in Table 1 in step 201 to determine a service application identifier corresponding to the received service flow.

203. Remove the service application attribute from the service flow, and send the service flow from which the service application attribute is removed to the destination virtual machine.

204. The destination virtual machine performs service processing on the service flow from which the service application attribute is removed.

In the present invention, correspondence between a service application attribute and a service application identifier is preconfigured on an NSP board so that after a service flow carrying a service application attribute is received, a service application identifier of the service flow may be determined, which service application corresponding to the service flow may be known according to the service application identifier corresponding to the service flow, the service flow is sent to only a destination virtual machine that is responsible for processing the service application, and even when virtual machines for processing a plurality of service applications are deployed on an NSP at the same time, a service flow can be correctly sent to a corresponding virtual machine for service processing.

Embodiment 3

Figure 5:
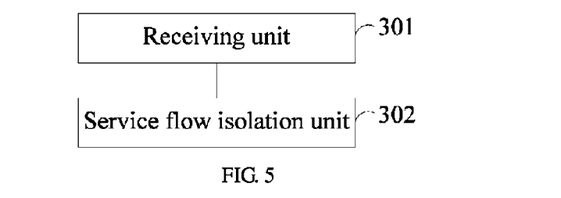
FIG. 5 is a schematic structural diagram of an apparatus for processing a service flow according to Embodiment 3 of the present invention.

As shown in FIG. 5, an embodiment of the present invention provides an apparatus for processing a service flow, where the apparatus for processing a service flow may be specifically implemented through an NSP board, and the apparatus specifically includes: a receiving unit 301 configured to receive a service flow into which a service application attribute is inserted by a network device; and a service flow isolation unit 302 configured to determine, according to preconfigured correspondence between a service application attribute and a service application identifier, a destination virtual machine capable of processing the service flow, remove the service application attribute from the service flow, and send the service flow from which the service application attribute is removed to the destination virtual machine.

It should be noted that, correspondence between a service application attribute and a service application identifier is stored in the apparatus for processing a service flow, and correspondence between a service flow attribute and a service application attribute may further be stored. Correspondence between a service flow attribute and a service application attribute is stored in a network device.

In the embodiment, the service application attribute includes one or more items of the following: a combination of a forwarding mode of a service flow and a source device number of the service flow, a destination device number, a source device port number, a destination device port number, a service priority, a virtual local area network VLAN identity of a source device, a VLAN identity of a destination device, and a CPU code.

A service flow packet is an object that is to be processed by an NSP board, a service flow is a set of service flow packets, and a service flow attribute is specifically an attribute indicated by each protocol field in the service flow packet, for example, a source MAC address, a destination MAC address, a VLAN identifier, a source IP address, a destination IP address, a source port number, and a destination port number of the service flow packet.

A service application identifier is specifically used to distinguish network interface information of virtual machines on an NSP, and includes a virtual network interface identifier, for example, an IP address or an MAC address of a virtual machine, or an identifier of a port for communications between a virtual network interface of a virtual machine and a service flow isolation unit.

A plurality of service application units may be established on an NSP. Each service application unit is specifically one virtual machine on an NSP board and is responsible for processing a different service application. A service flow processed by a virtual machine is sent by a switching unit of a network device, and is obtained through forwarding of a service flow isolation unit. A corresponding virtual network interface is configured for each virtual machine. In the embodiment, the service flow isolation unit determines, through a service application identifier, a destination virtual machine to which a service flow is forwarded.

The network device inserts a service application attribute into a service flow sent by a user terminal, which specifically includes two scenarios:

(1) When the service application attribute includes one or more items of the following: a combination of a forwarding mode of a service flow and a source device number of the service flow, a destination device number, a source device port number, a destination device port number, a service priority, a virtual local area network VLAN identity of a source device, and a VLAN identity of a destination device, the network device receives the service flow sent by the user terminal, and inserts the service application attribute into the service flow according to a service flow attribute.

Specifically, the network device receives the service flow sent by the user terminal. When the service flow passes through a CPU of the network device, a software module on the CPU of the network device inserts the service application attribute into the service flow according to the service flow attribute. When the service flow passes through a LAN interface, a forwarding chip of LAN interface hardware inserts the service application attribute into the service flow according to the service flow attribute.

(2) When the service application attribute includes a CPU code, the network device inserts the CPU code into the service flow according to a service flow attribute and correspondence between a service flow attribute and a CPU code in a service application attribute. Specifically, when the service flow passes through a LAN interface, a forwarding chip of LAN interface hardware inserts the CPU code into the service flow according to the service flow attribute.

Figure 6:
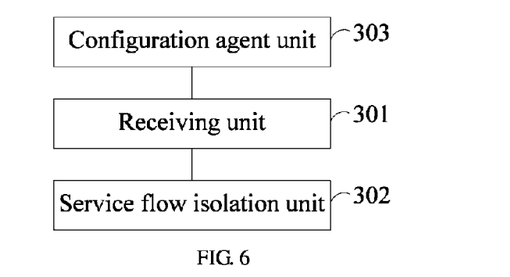
FIG. 6 is a second schematic structural diagram of an apparatus for processing a service flow according to Embodiment 3 of the present invention.

Further, as shown in FIG. 6, when the service application attribute includes a CPU code, the apparatus for processing a service flow further includes a configuration agent unit 303 configured to configure the correspondence between a CPU code in a service application attribute and a service application identifier and the correspondence between a service flow attribute and a CPU code in a service application attribute, and send the correspondence between a service flow attribute and a CPU code in a service application attribute to the network device.

It should be noted that, during specific implementation, the apparatus for processing a service flow may include three types of architectures.

Figure 7:
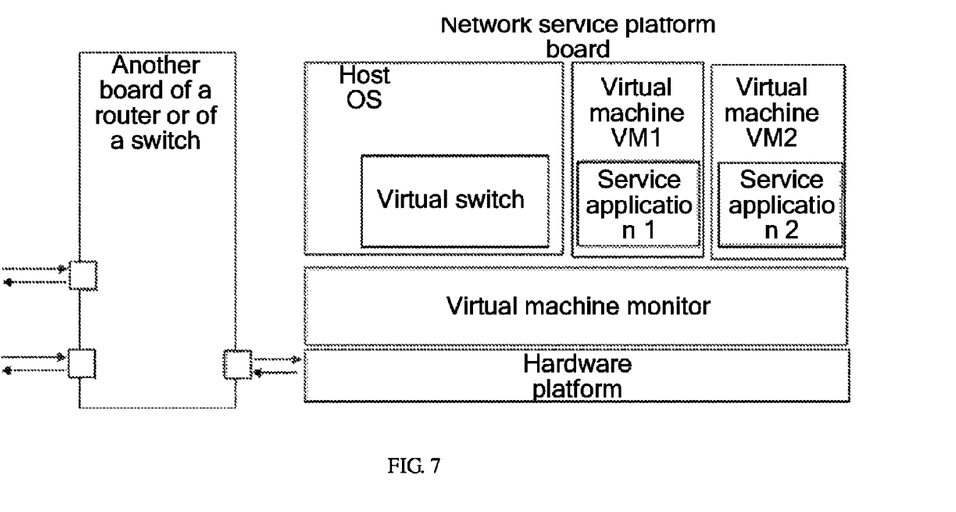
FIG. 7 is a first architecture diagram during implementation of an NSP according to Embodiment 3 of the present invention.

FIG. 7 specifically shows an NSP architecture 1.

The NSP architecture includes a host operating system (OS) of an NSP, a plurality of virtual machines (VMs), and a virtual machine monitor.

The host OS of the NSP is a host operating system of the NSP and is configured to provide a relevant function for network management and maintenance of the NSP.

In host OS of the NSP, a virtual switch (vSwitch) is established, and the virtual switch is configured to implement service flow forwarding and perform route forwarding on a service flow. The service flow isolation unit in the apparatus provided in the present invention may be implemented through the virtual switch.

A plurality of switches is established based on the host OS and is configured to process various service applications. In the present invention, performing various service applications on the service flow may be implemented through the virtual machine during a specific implementation.

Figure 8:
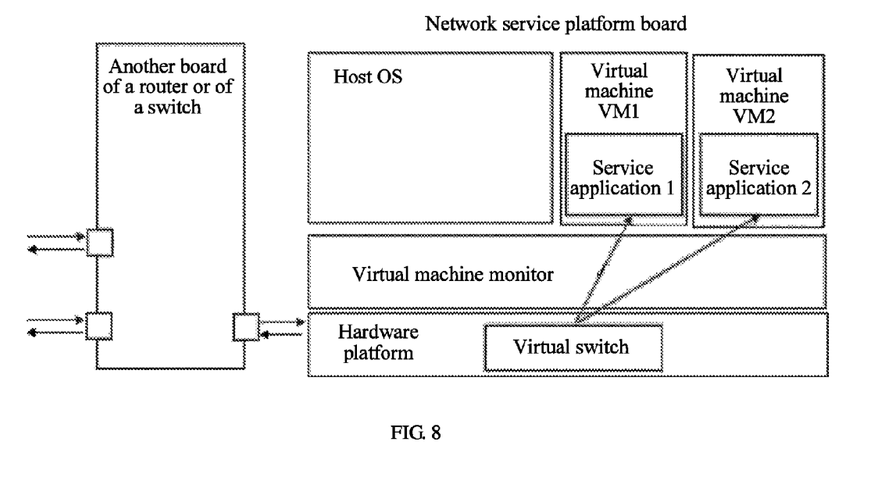
FIG. 8 is a second architecture diagram during implementation of an NSP according to Embodiment 3 of the present invention.

FIG. 8 specifically shows an NSP architecture 2.

A difference between the NSP architecture 2 and the NSP architecture 1 lies in that, in the NSP architecture 1, the service flow isolation unit is implemented through the virtual switch established in the host OS of the NSP, whereas in the NSP architecture 2, the service flow isolation unit is implemented through a virtual switch directly established on an NSP hardware platform. Other modules are no longer described herein.

Figure 9:
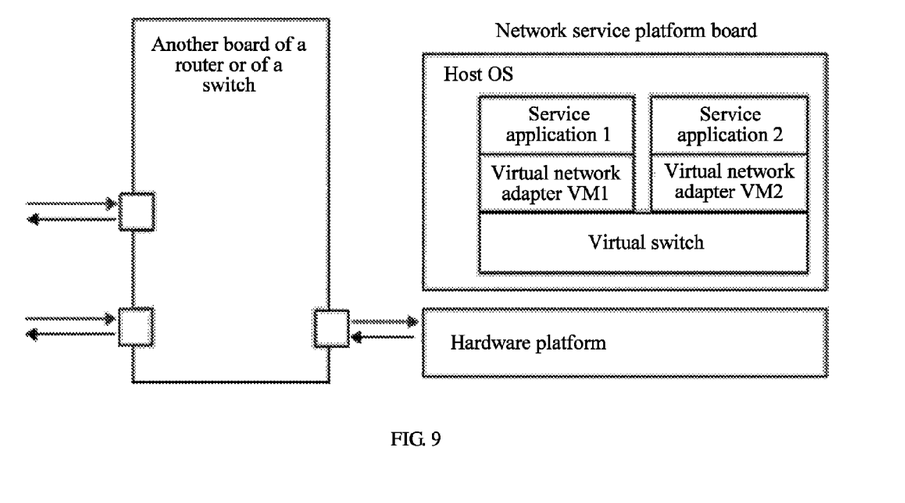
FIG. 9 is a third architecture diagram during implementation of an NSP according to Embodiment 3 of the present invention.

FIG. 9 specifically shows an NSP architecture 3.

In the NSP architecture 3, a virtual switch used for implementing the service flow isolation unit is established in a physical network device driver in the host OS of the NSP.

With the apparatus for processing a service flow provided in the present invention, correspondence between a service application attribute and a service application identifier is preconfigured so that after a service flow carrying a service application attribute is received, a service application identifier of the service flow may be determined, which service application corresponding to the service flow may be known according to the service application identifier corresponding to the service flow, the service flow is sent to only a destination virtual machine that is responsible for processing the service application, and even when virtual machines for processing a plurality of service applications are deployed on an NSP at the same time, a service flow can be correctly sent to a corresponding virtual machine for service processing.

Further, based on the apparatus provided in Embodiment 3, a system for processing a service flow includes the apparatus for processing a service flow provided in Embodiment 3 and a network device.

The network device is configured to send a service flow into which a service application attribute is inserted to the apparatus for processing a service flow.

In the embodiment, the network device may specifically be a router or a switch.

It should be noted that the apparatus for processing a service flow provided in the foregoing embodiment is described only by taking division of the foregoing functional modules as an example. In a practical application, the foregoing functions may be assigned to different functional modules to accomplish according to a requirement. That is, an internal structure of the apparatus for processing a service flow is divided into different functional modules to accomplish a part or all of the functions described in the foregoing. In addition, the apparatus for processing a service flow and the method for processing a service flow provided in the foregoing embodiments belong to the same concept. Reference is made to the method embodiments for a specific implementation process, which is no longer described herein.

All or a part of contents in the technical solutions provided in the foregoing embodiments may be implemented through software programming. A software program is stored in a readable storage medium, for example, a hard disk, a compact disc, or a floppy disk in a computer.

The foregoing descriptions are merely exemplary embodiments of the present invention, but are not intended to limit the present invention. Any modification, equivalent replacement, or improvement made within the spirit and principle of the present invention shall all fall within the protection scope of the present invention.

What is claimed is:

1. A method for processing a service flow, comprising:
   receiving the service flow into which a service application attribute is inserted by a network device;
   determining, according to preconfigured correspondence between the service application attribute and a service application identifier, a destination virtual machine capable of processing the service flow;
   removing the service application attribute from the service flow; and
   sending the service flow from which the service application attribute is removed to the destination virtual machine.

2. The method according to claim 1, wherein the service application identifier comprises a virtual network interface identifier of the destination virtual machine, and wherein determining, according to the preconfigured correspondence between the service application attribute and the service application identifier, the destination virtual machine capable of processing the service flow comprises determining, according to the preconfigured correspondence between the service application attribute and the service application identifier, the network interface identifier of the destination virtual machine capable of processing the service flow.

3. The method according to claim 1, wherein the service application identifier comprises an identifier of a port for communications with the destination virtual machine, and wherein determining, according to the preconfigured correspondence between the service application attribute and the service application identifier, the destination virtual machine capable of processing the service flow comprises determining, according to the preconfigured correspondence between the service application attribute and the service application identifier, the identifier of the port for communications with the destination virtual machine.

4. The method according to claim 1, wherein the service application attribute comprises one or more items of the following: a combination of a forwarding mode of the service flow and a source device number of the service flow, a destination device number, a source device port number, a destination device port number, a service priority, a virtual local area network (VLAN) identity of a source device, and a VLAN identity of a destination device, and wherein when the service flow passes through the network device, the service application attribute is inserted into the service flow by the network device according to an attribute of the service flow and correspondence between the attribute of the service flow and the service application attribute.

5. The method according to claim 4, wherein the service application attribute further comprises a central processing unit (CPU) code.

6. The method according to claim 5, further comprising:
   configuring the correspondence between the CPU code in the service application attribute and the service application identifier and the correspondence between the attribute of the service flow and the CPU code in the service application attribute; and
   sending the correspondence between the attribute of the service flow and the CPU code in the service application attribute to the network device.

7. The method according to claim 1, wherein the service application attribute comprises a central processing unit (CPU) code, and wherein the CPU code is inserted into the service flow by the network device according to an attribute of the service flow and correspondence between the attribute of the service flow and the CPU code in the service application attribute.

8. The method according to claim 7, further comprising:
   configuring the correspondence between the CPU code in the service application attribute and the service application identifier and the correspondence between the attribute of the service flow and the CPU code in the service application attribute; and
   sending the correspondence between the attribute of the service flow and the CPU code in the service application attribute to the network device.

9. An apparatus for processing a service flow, comprising a hardware platform executing instructions stored on a non-transitory computer-readable storage medium, to perform functions as a plurality of modules, the modules comprising:
   a receiving unit configured to receive the service flow into which a service application attribute is inserted by a network device; and
   a service flow isolation unit configured to:
      determine, according to preconfigured correspondence between the service application attribute and a service application identifier, a destination virtual machine capable of processing the service flow;
      remove the service application attribute from the service flow; and
      send the service flow from which the service application attribute is removed to the destination virtual machine.

10. The apparatus according to claim 9, wherein the service application identifier comprises a virtual network interface identifier of the destination virtual machine, and wherein the service flow isolation unit is configured to:
   determine, according to the preconfigured correspondence between the service application attribute and the service application identifier, the network interface identifier of the destination virtual machine capable of processing the service flow;
   remove the service application attribute from the service flow; and
   send the service flow from which the service application attribute is removed to the destination virtual machine.

11. The apparatus according to claim 9, wherein the service application identifier comprises an identifier of a port for communications with the destination virtual machine, and wherein the service flow isolation unit is configured to:
   determine, according to the preconfigured correspondence between the service application attribute and the service application identifier, the identifier of the port for communications with the destination virtual machine;
remove the service application attribute from the service flow; and
send the service flow from which the service application attribute is removed to the destination virtual machine.

12. The apparatus according to claim 9, wherein the service application attribute comprises one or more items of the following: a combination of a forwarding mode of the service flow and a source device number of the service flow, a destination device number, a source device port number, a destination device port number, a service priority, a virtual local area network (VLAN) identity of a source device, and a VLAN identity of a destination device, and wherein when the service flow passes through the network device, the service application attribute is inserted into the service flow by the network device according to an attribute of the service flow and correspondence between the attribute of the service flow attribute and the service application attribute.

13. The apparatus according to claim 12, wherein the service application attribute further comprises a central processing unit (CPU) code.

14. The apparatus according to claim 13, further comprising a configuration agent unit configured to:
configure the correspondence between the CPU code in the service application attribute and the service application identifier and the correspondence between the attribute of the service flow and the CPU code in the service application attribute; and
send the correspondence between the attribute of the service flow and the CPU code in the service application attribute to the network device.

15. The apparatus according to claim 9, wherein the service application attribute comprises a central processing unit (CPU) code, and wherein the CPU code is inserted into the service flow by the network device according to an attribute of the service flow and correspondence between the attribute of the service flow and the CPU code in the service application attribute.

16. The apparatus according to claim 15, further comprising a configuration agent unit configured to:
configure the correspondence between the CPU code in the service application attribute and the service application identifier and the correspondence between the attribute of the service flow and the CPU code in the service application attribute; and
send the correspondence between the attribute of the service flow and the CPU code in the service application attribute to the network device.

17. A system for processing a service flow, wherein the system comprises:
a network device; and
a Network Service Platform (NSP) board configured to:
receive a service flow into which a service application attribute is inserted by the network device;
determine, according to preconfigured correspondence between the service application attribute and a service application identifier, a destination virtual machine capable of processing the service flow;
remove the service application attribute from the service flow; and
send the service flow from which the service application attribute is removed to the destination virtual machine,
wherein the network device is configured to send, to the NSP board, the service flow into which the service application attribute is inserted.

18. The system according to claim 17, wherein the service application attribute comprises a central processing unit (CPU) code, and wherein the CPU code is inserted into the service flow by the network device according to an attribute of the service flow and correspondence between the attribute of the service flow and the CPU code.

19. The system according to claim 17, the NSP board is further configured to:
configure the correspondence between the CPU code in the service application attribute and the service application identifier and the correspondence between the attribute of the service flow and the CPU code in the service application attribute; and
send the correspondence between the attribute of the service flow and the CPU code in the service application attribute to the network device.

* * * * *